United States Patent
Sundaram et al.

(10) Patent No.: US 9,418,018 B2
(45) Date of Patent: Aug. 16, 2016

(54) EFFICIENT FILL-BUFFER DATA FORWARDING SUPPORTING HIGH FREQUENCIES

(71) Applicant: Samsung Electronics Co., Ltd., Suwon-si, Gyeonggi-do (KR)

(72) Inventors: Karthik Sundaram, Austin, TX (US); Rama Gopal, Austin, TX (US); Murali Chinnakonda, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 203 days.

(21) Appl. No.: 14/337,211

(22) Filed: Jul. 21, 2014

(65) Prior Publication Data

US 2015/0186292 A1    Jul. 2, 2015

Related U.S. Application Data

(60) Provisional application No. 61/922,796, filed on Dec. 31, 2013.

(51) Int. Cl.
    *G06F 12/10*    (2016.01)
    *G06F 12/08*    (2016.01)
    *G06F 9/38*    (2006.01)

(52) U.S. Cl.
    CPC ........ *G06F 12/1045* (2013.01); *G06F 12/0859* (2013.01); *G06F 12/1009* (2013.01); *G06F 9/3861* (2013.01); *G06F 12/0811* (2013.01); *G06F 2212/1024* (2013.01); *G06F 2212/507* (2013.01)

(58) Field of Classification Search
    CPC ............ G06F 12/0855; G06F 12/0895; G06F 12/1063; G06F 2212/1021; G06F 9/30043; G06F 9/3861
    See application file for complete search history.

(56) References Cited

U.S. PATENT DOCUMENTS

| | | | |
|---|---|---|---|
| 5,845,101 A | 12/1998 | Johnson et al. | |
| 6,012,134 A * | 1/2000 | McInerney | G06F 9/3802 711/141 |
| 6,622,211 B2 | 9/2003 | Henry et al. | |
| 6,662,280 B1 | 12/2003 | Hughes | |
| 7,139,877 B2 * | 11/2006 | Hooker | G06F 9/30043 711/119 |
| 7,451,271 B2 | 11/2008 | O'Connor | |
| 8,271,732 B2 | 9/2012 | Cohen et al. | |
| 2005/0223153 A1* | 10/2005 | O'Connor | G06F 12/1063 711/3 |
| 2008/0082721 A1* | 4/2008 | Yu | G06F 12/0864 711/3 |
| 2010/0146212 A1* | 6/2010 | Cohen | G06F 12/0864 711/128 |
| 2010/0268987 A1* | 10/2010 | Clark | G06F 9/3867 714/16 |
| 2011/0271057 A1* | 11/2011 | Karlsson | G06F 12/0855 711/122 |

* cited by examiner

*Primary Examiner* — Ryan Bertram
(74) *Attorney, Agent, or Firm* — Renaissance IP Law Group LLP

(57) ABSTRACT

A Fill Buffer (FB) based data forwarding scheme that stores a combination of Virtual Address (VA), TLB (Translation Look-aside Buffer) entry# or an indication of a location of a Page Table Entry (PTE) in the TLB, and a TLB page size information in the FB and uses these values to expedite FB forwarding. Load (Ld) operations send their non-translated VA for an early comparison against the VA entries in the FB, and are then further qualified with the TLB entry# to determine a "hit." This hit determination is fast and enables FB forwarding at higher frequencies without waiting for a comparison of Physical Addresses (PA) to conclude in the FB. A safety mechanism may detect a false hit in the FB and generate a late load cancel indication to cancel the earlier-started FB forwarding by ignoring the data obtained as a result of the Ld execution. The Ld is then re-executed later and tries to complete successfully with the correct data.

21 Claims, 5 Drawing Sheets

EFFICIENT FILL-BUFFER DATA FORWARDING SUPPORTING HIGH FREQUENCIES

CROSS-REFERENCE TO RELATED APPLICATIONS

This application claims the priority benefit under 35 U.S.C. §119(e) of U.S. Provisional Application No. 61/922,796 filed on Dec. 31, 2013, the disclosure of which is incorporated herein by reference in its entirety.

TECHNICAL FIELD

The present disclosure generally relates to processors. More particularly, and not by way of limitation, particular embodiments of the inventive aspects disclosed in the present disclosure are directed to memory operations involving Fill Buffer (FB) based data forwarding within a processor at high frequencies.

BACKGROUND

A processor or microprocessor (popularly and conveniently referred to as a Central Processing Unit or "CPU") may have a Load Store (LS) unit having an associated LS scheduler which picks memory instructions to execute. To reduce instruction execution time, modern CPUs store copies of frequently-used data into smaller, faster memories so as to avoid delays associated with accessing slower system memory (e.g., a Random Access Memory or "RAM") for data. These faster memories are referred to as caches that may co-exist with a processor's processing core on the same chip, thereby significantly reducing data access time. Different independent caches may be organized as a hierarchy of cache levels—i.e., Level 1 (or L1) cache, Level 2 (L2) cache, Level 3 (or L3) cache, etc., with the lowest level cache (i.e., L1 cache) being accessed first before moving on to the next level of cache. If there is an L1 cache "hit" for a memory instruction, the associated data is returned to the execution units. When the memory instruction "misses" in the L1 cache, a miss request is allocated into a Fill Buffer (FB) and a Replay Queue (RQ), and the miss request is then sent to the next (higher) level cache L2 or to the system bus (e.g., to access the system memory). The data being returned from the L2 cache (or the system bus) for the miss request is written back into the Fill Buffer and queued up for subsequent filling into the L1 cache.

When the data is being returned by the next level L2 cache or the system bus, there are two choices to handle the Load (Ld) instruction sitting in the Replay Queue:

(1) Stall the pick (of the Ld instruction that created the miss request) from the Load Store scheduler or RQ so that the data coming from L2 or bus can be first written into the FB and then into the L1 cache. Here, the Ld is held back in the LS scheduler/RQ until the data in the FB has been written into the L1 cache. The Ld instruction that caused the miss is then "woken up" from RQ/LS scheduler and gets its data from the L1 cache. This approach leads to a sub-optimal performance.

(2) Capture the data into the Fill Buffer and then forward the data from the Fill Buffer. Here, the Ld instruction in the RQ/LS scheduler is "woken up" and the instruction starts forwarding the data from the FB while the data from the L2/bus is being written/captured into the FB (and not into the L1 cache). Thus, the Ld instruction gets its data from the FB and completes its execution. At some later point in time, when the L1 cache is idle, the FB data is then transferred to or written into the L1 cache. This leads to higher performance because the LS scheduler/RQ are not interrupted to write data from the L2 cache/bus into the L1 cache (through the FB); the L1 cache remains free to service Load (Ld)/Store (St) instructions from the LS scheduler or RQ, and is not interrupted by writes from the FB.

In the option-2 above, subsequent load instructions that miss in the L1 (e.g., because the FB data is not yet transferred to the L1 cache), but hit in the FB, can forward the associated data from the FB. Hence, the option-2 above may be referred to as "Fill Buffer forwarding" or "FB forwarding."

SUMMARY

Prior schemes to forward data from the FB (e.g., during execution of a Ld instruction) have typically used Physical Address (PA) bits associated with the instruction. When the data is returned from the L2 cache/bus and when the Ld is "woken up," the PA address of the Ld instruction is compared against the address/entries stored in the FB. A successful match allows the Ld to get its data from the FB.

In general, to forward data from the FB, the following sequence of steps may need to be performed: (i) The Virtual Address (VA) for the Ld instruction needs to be picked from the LS scheduler/RQ. (ii) The virtual address needs to be translated into a corresponding physical address (e.g., through a Translation Look-aside Buffer or "TLB"). (iii) The physical address then needs to be compared against the entries in the Fill Buffer. (iv) The data needs to be read out from the matching FB entry. One problem with the above-mentioned physical address comparison approach is the inability to perform FB forwarding at higher frequencies. Because a physical address can be as large as 40 bits, performing a PA comparison and data forwarding in one clock cycle at very high frequencies may not be possible in a traditional FB forwarding scheme.

Hence, it is desirable to devise an FB forwarding scheme that allows data forwarding from an FB at higher frequencies. It is further desirable to have a mechanism that can detect and handle incorrect forwarding from FB.

In particular embodiments of the present disclosure, when a load (Ld) operation misses in an L1 cache, the following parameters are stored in an FB (e.g., when a request for data from the L2 cache or system bus is sent): (i) a virtual address of the Ld instruction that caused the cache "miss", (ii) a tag indicating the location of a physical address in a TLB (i.e., a TLB entry# or location of a Page Table Entry (PTE) in the TLB) associated with the VA of the Ld instruction, and (iii) the page size information obtained from the TLB indicating the page size of the memory page associated with the PTE. Subsequent load operations send their non-translated virtual address for an early comparison against the VA entries in the FB, and are then further qualified with the TLB entry# to determine a "hit." This hit determination is fast and enables forwarding the data from the FB to the Ld instruction in a timely manner. In one embodiment, the present disclosure incorporates a scheme to catch inaccurate address matches (which may have been caused by TLB invalidations) and prevents the load instruction from forwarding the data from the FB. Furthermore, in particular embodiments, a safety net mechanism may be employed which detects a false hit in the FB and generates a late load cancel indication.

In one embodiment, the present disclosure is directed to a method that comprises the following: (i) determining whether there is a hit in a first level of cache memory for a processor when a Load (Ld) instruction is processed for execution; (ii) in the absence of the hit in the first level of cache memory, storing the following content in a Fill Buffer (FB) of the processor: (a) a Virtual Address (VA) provided by the Ld instruction, (b) an indication of a location of a Page Table Entry (PTE) in a Translation Look-aside Buffer (TLB) of the processor, wherein the PTE is associated with the VA provided by the Ld instruction, and (c) information obtained from the TLB indicating a page size of a memory page associated with the PTE.

In another embodiment, the present disclosure is directed to a method of processing an Ld instruction for execution by a Load Store (LS) scheduler of a processor. The method comprises: (i) comparing a first VA provided by the Ld instruction against entries in a TLB of the processor to obtain a first indication of a location of a first PTE in the TLB, wherein the first PTE is associated with the first VA of the Ld instruction; (ii) comparing the first VA and the first indication against entries in an FB of the processor to determine whether the first VA matches a second VA provided by the Ld instruction and stored in the FB, and whether the first indication matches a second indication stored in the FB, wherein the second indication is an indication of a location of a second PTE in the TLB, wherein the second PTE is associated with the second VA of the Ld instruction, and wherein the second VA and the second indication are stored in the FB along with information obtained from the TLB indicating a page size of a memory page associated with the second PTE when an earlier processing of the Ld instruction by the LS scheduler for execution results in the absence of a hit in a cache memory for the processor; and (iii) upon finding a match between the first and the second VAs and between the first and the second indications, identifying a corresponding matching entry in the FB as a predicted FB entry and starting to read the data from the FB associated with the predicted FB entry.

In a further embodiment, the present disclosure is directed to a processor, which comprises: (i) a first level of cache memory; (ii) a detection logic coupled to the first level of cache memory and configured to determine whether there is a hit in a first level of cache memory when a Load (Ld) instruction is processed for execution; (iii) an FB coupled to the first level of cache memory; (iv) a Load Store Unit (LSU) coupled to the FB and the detection logic, and configured to capture data associated with the Ld instruction into the FB in the absence of the hit in the first level of cache memory; and (v) a TLB coupled to the FB and the LSU, and configured to store therein an indication of a location of a PTE associated with a VA provided by the Ld instruction. In the processor, the FB is configured to store therein the following: (a) the VA, and (b) the indication of the location of the PTE.

In yet another embodiment, the present disclosure is directed to a system that comprises a memory configured to store a plurality of program instructions; and a processor coupled to the memory to retrieve therefrom and execute the plurality of program instructions. In the system, the processor is configured to also perform the following: (i) determine whether there is a hit in a cache memory for the processor when an Ld instruction is processed for execution by an LS scheduler of the processor; and (ii) in the absence of the hit in the cache memory, store the following in an FB of the processor: (a) a VA of the Ld instruction, (b) an indication of a location of a PTE in a TLB of the processor, wherein the PTE is associated with the VA of the Ld instruction, and (c) information obtained from the TLB indicating a page size of a memory page associated with the PTE.

Thus, particular embodiments of the present disclosure provide for a data forwarding scheme that stores a combination of virtual address, TLB entry#, and TLB page size information in the FB and uses these values to expedite FB forwarding upon a suitable match. Such an approach facilitates FB data forwarding at higher frequencies. One of the inventive aspects of the present disclosure also provides for a mechanism to detect and handle incorrect forwarding from the FB.

BRIEF DESCRIPTION OF THE DRAWINGS

In the following section, the inventive aspects of the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the disclosed inventive aspects may be practiced without these specific details. In other instances, well-known methods, procedures, components and circuits have not been described in detail so as not to obscure the present disclosure. Additionally, it should be understood that although the disclosure is described primarily in the context of a single-core microprocessor, the described inventive aspects can be implemented in multi-core microprocessors and larger processors as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "single-core," "pre-determined", "VA-specific," etc.) may be occasionally interchangeably used with its non-hyphenated version (e.g., "single core," "predetermined", "VA specific," etc.), and a capitalized entry (e.g., "Virtual Address," "Fill Buffer," etc.) may be interchangeably used with its non-capitalized version (e.g., "virtual address," "fill buffer," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such.

Figure 1:
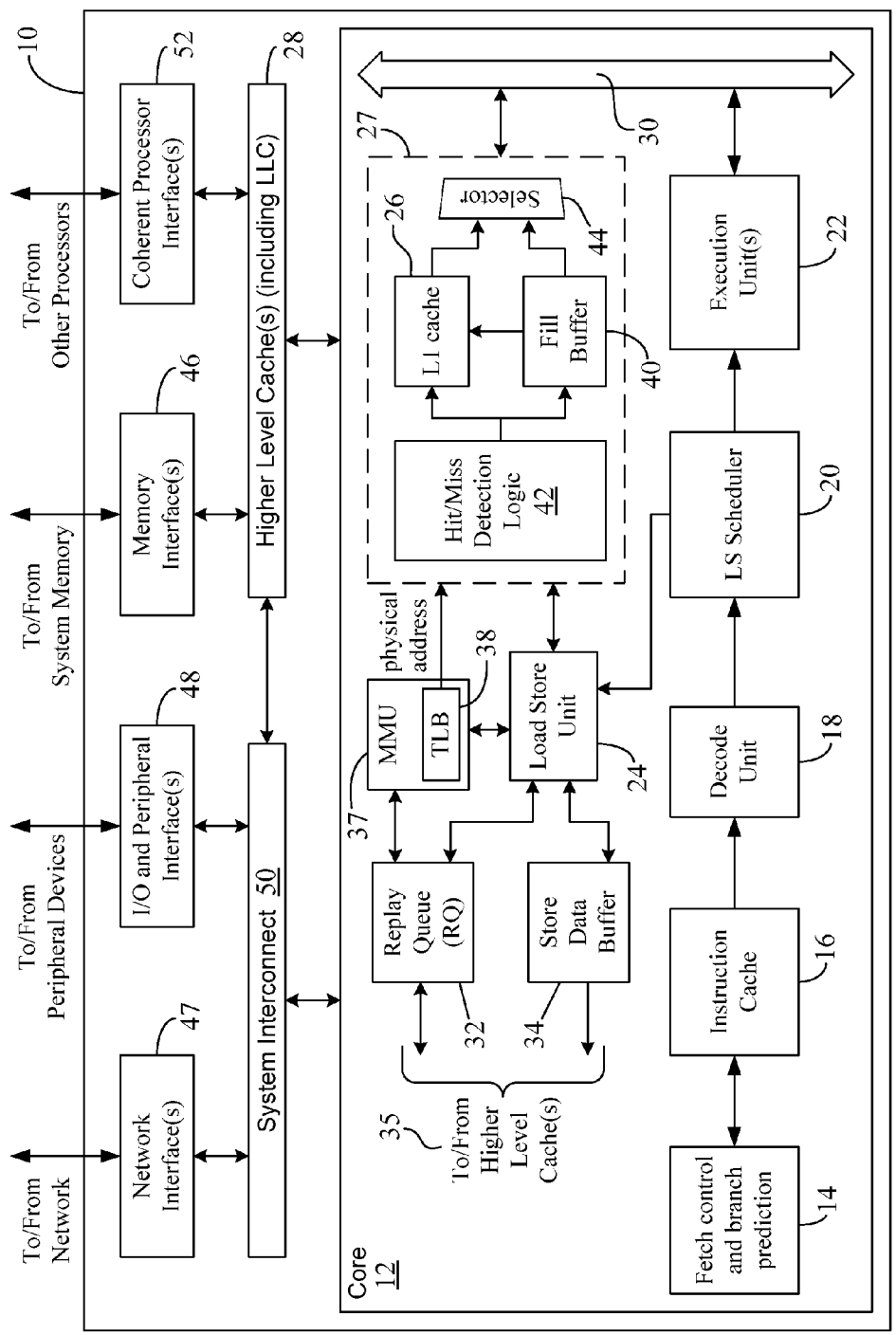
FIG. 1 shows exemplary architectural details of a processor according to one embodiment of the present disclosure.

FIG. 1 shows exemplary architectural details of a processor 10 according to one embodiment of the present disclosure. The processor 10 may be a general purpose microprocessor having the functionality of a Central Processing Unit (CPU). In the discussion below, the terms "processor" and "CPU" may be used interchangeably for ease of discussion. However, as noted before, the processor 10 may be any other type of processor such as, for example, a microcontroller, a Digital Signal Processor (DSP), a Graphics Processing Unit (GPU), a dedicated Application Specific Integrated Circuit (ASIC) processor, etc. In the embodiment of FIG. 1, the processor 10 is shown to include a single processor core 12 (which also may be referred to herein as a "CPU core"). However, in other embodiments, the processor 10 may be an apparatus that includes more than one processing core—varying embodiments of the processor 10 may include a varying number of cores (not shown) such as, for example, 4 cores, 8 cores, 16 cores, or any other suitable number. In one embodiment, each of these additional cores may have at least a portion of its configuration similar to that shown for the core 12 in FIG. 1.

The CPU core 12 may be configured to execute instructions and to process data according to a particular Instruction Set Architecture (ISA) such as, for example, an x86 instruction set architecture (32-bit or 64-bit versions), a PowerPC® ISA, or a MIPS (Microprocessor without Interlocked Pipeline Stages) instruction set architecture relying on RISC (Reduced Instruction Set Computer) ISA. In the embodiment of FIG. 1, only those portions of the core 12 that are relevant to the present disclosure are shown to simplify the drawing and avoid unnecessary details. It is understood, however, that many additional circuit elements and processing blocks other than those shown in FIG. 1 may be present as part of the core 12 to impart true CPU functionality to the processor 10.

A fetch control and branch prediction unit 14 may operate with an instruction cache 16 to provide a program counter for fetching an instruction or a group of instructions from the instruction cache 16. When instructions are being fetched, if there is a "miss" in instruction cache 16, then a miss memory request may be generated and, in response, instruction stream prefetch misses may also be generated for consecutive blocks of instructions, and the instructions from these blocks may or may not be executed. In any event, when there is a "hit" in the instruction cache 16, the instruction or a set of instructions associated with that "hit" may be dispatched to a decode unit 18 coupled to the instruction cache 16. The decode unit 18 may provide decoded instructions to a Load Store (LS) scheduler 20. In one embodiment, the decoded instructions may be provided to the LS scheduler 20 via a combination of a dispatch queue (not shown) and a register renaming unit (not shown) to allow mapping of register names to physical registers (not shown) in the CPU core 12.

In one embodiment, the scheduler 20 may be coupled to a register file (not shown), which may include a set of registers usable to store operands (to be supplied to the LS scheduler 20) and the results of instructions executed by an execution unit 22. The scheduler 20 may map the logical registers to the physical registers in the register file. The logical registers may include both architected registers specified by the Instruction Set Architecture (ISA) implemented by the CPU 10 and temporary registers that may be used as destinations of operations for temporary results and sources of subsequent operations.

As shown in FIG. 1, in addition to being coupled to the execution unit 22, the scheduler 20 also may be coupled to provide load and store operands for execution to a Load Store Unit (LSU) 24. The scheduler 20 may identify instructions without dependencies and issue these instructions to the execution unit 22 and the LSU 24. The execution unit 22 may execute instructions over one or more processor clock cycles and write the results to a data cache 26 in a data cache control unit 27 and/or a higher level cache 28 (discussed later) via an internal processor bus 30. In one embodiment, the execution unit 22 may include one or more special-purpose execution units such as, for example, an integer unit, a floating point unit, a vector unit, etc. Each of such execution units may be fully pipelined and may be configured to accept an instruction in every clock cycle. Execution of instructions may occur speculatively and out of order, and, in some embodiments, there may be additional circuitry (not shown) in the core 12 to handle exceptions arising during execution of instructions.

The Load Store Unit (LSU) 24 may be coupled to the LS scheduler 20, the data cache control unit 27, a load miss queue (also referred to as a Replay Queue (RQ)) 32, and a store data buffer 34. In one embodiment, the LSU 24 may include various pipeline stages for performing memory access operations. For example, the LSU 24 may include a first pipeline stage for generating addresses for load and store operations. Other pipeline stages may be configured for reading the tag store and the data store of the data cache 26. In one embodiment, the LSU 24 may be configured to store load misses in the RQ 32, and may also be configured to write store addresses and store data to store data buffer 34. In another embodiment, if a load operation partially hits on multiple entries in the load miss queue 32, then the load may be replayed from the LS scheduler 20.

As indicated at reference numeral "35" in FIG. 1, the RQ 32 and the store data buffer 34 may access higher level cache(s) (e.g., an L2 cache or higher) at block 28 or system memory (not shown) for load misses or data storage operations.

Figure 2:
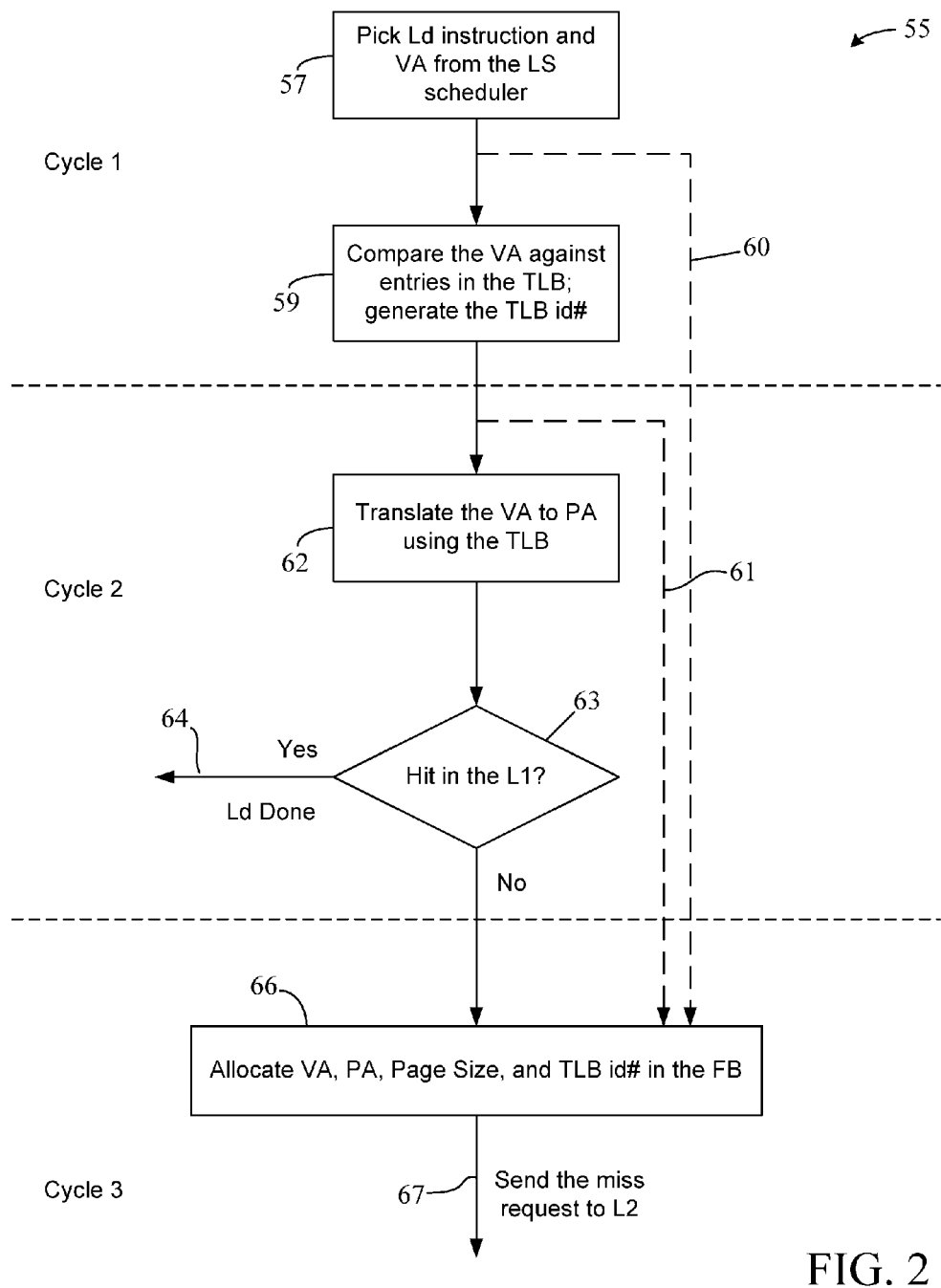
FIG. 2 depicts an exemplary flowchart showing what content is stored in an FB according to one embodiment of the present disclosure when a load miss occurs in an L1 data cache associated with the FB.
Figure 3:
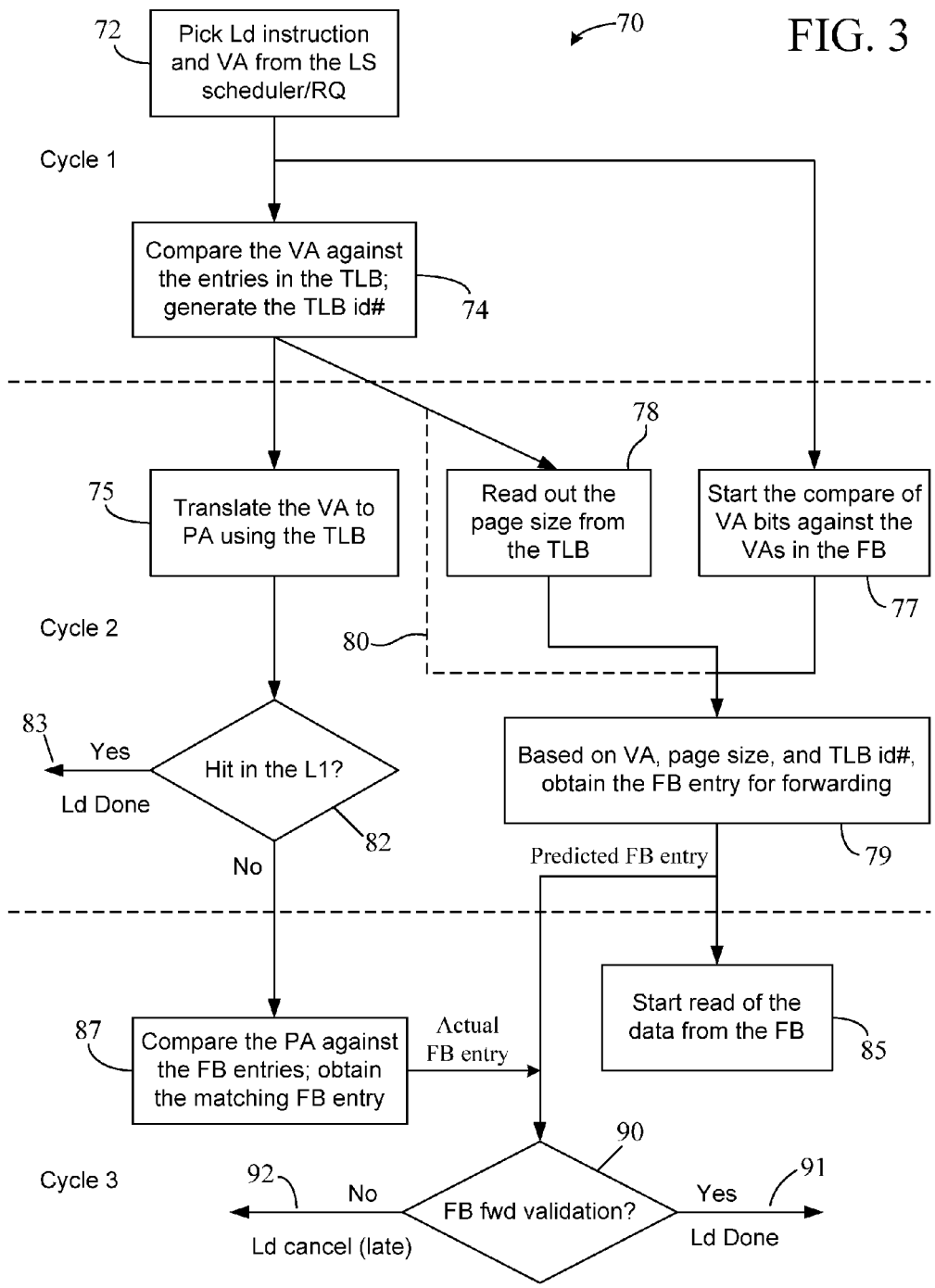
FIG. 3 is an exemplary flowchart showing how FB forwarding at high frequencies may be supported according to one embodiment of the present disclosure.
Figure 4:
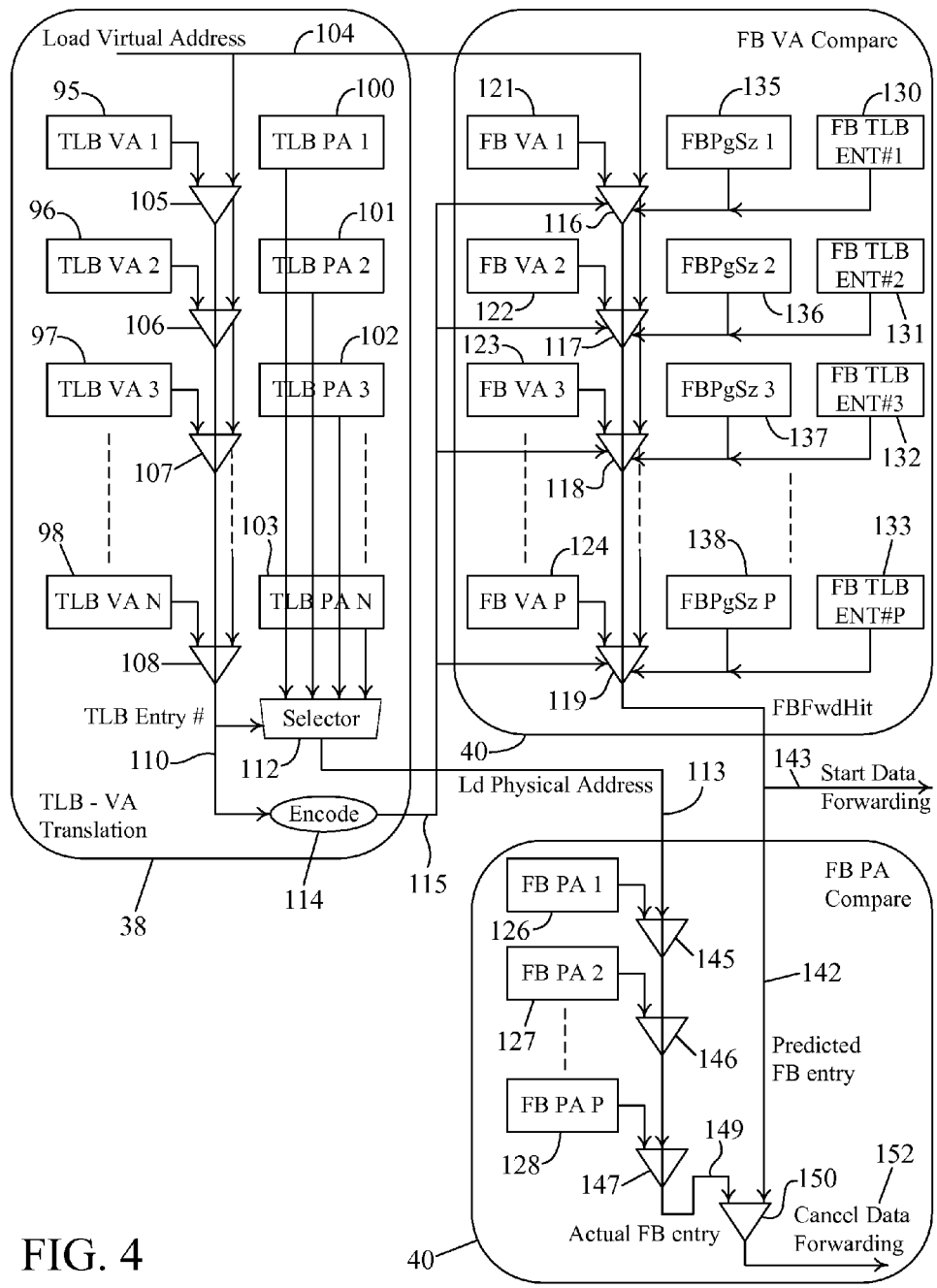
FIG. 4 shows exemplary hardware configurations of a TLB and an FB to implement the FB forwarding according to one embodiment of the present disclosure.

A Memory Management Unit (MMU) 37 may be coupled to the LSU 24, the RQ 32, and the data cache control unit 27. The MMU 37 may include a Translation Look-aside Buffer (TLB) 38 (discussed in more detail later below) to translate a virtual address (VA) provided by an instruction into a corresponding physical address (PA) of a memory location (e.g., in a system memory (not shown)). According to certain inventive aspects of the present disclosure, the TLB 38 may be configured to provide a TLB entry# (i.e., location of a Page Table Entry (PTE)) and corresponding physical address and page size information to a Fill Buffer (FB) 40 in the control unit 27 for storage therein. The exemplary embodiment in FIG. 4 illustrates the relevant hardware configuration, and FIGS. 2-3 illustrate these inventive aspects in more detail. In one embodiment, the MMU 37 may also contain a large page array and a page descriptor array. A miss in the TLB 38 may initiate a hardware fill from an in-memory page table (in the MMU 37) (not shown) to provide Page Table Entries (PTEs) to the TLB 38. As is known, a page table is where an operating system stores its mappings of virtual addresses to physical addresses. Each mapping is known as a PTE.

The LSU 24 may transmit the (physical) addresses of the load and store instructions to a hit/miss detection logic 42 of the data cache control unit 27. The detection logic 42 may be coupled to the data (L1) cache 26 and the fill buffer 40 (which may include more than one buffer in certain embodiments). The hit/miss detection logic 42 may determine, e.g., through an address comparison, whether the incoming instructions "hit" either the L1 cache 26 or the FB 40. The L1 cache 26 and the FB 40 may be coupled to a selector 44 (e.g., a multiplexer) for returning load request data back to the execution unit 22 and/or other appropriate registers (not shown) in the processor core 12 via the internal processor bus 30. The FB 40 may be coupled to L1 cache 26 as well to write appropriate data into the L1 cache 26 upon a "miss" in the L1 cache. As mentioned earlier, such data may be received into the FB 40 from the next level (e.g., L2) cache or from the system memory (e.g., via a system bus) or other higher order cache. When a miss request is allocated into the FB 40 (e.g., by the hit/miss detection logic 42), the earlier-described FB forwarding may also occur while the data is being transferred into the FB 40 (and not into the L1 cache 26).

In the embodiment of FIG. 1, the instruction cache 16 and the data cache 26 may be considered as Level-1 (L1) caches. These caches may be physically-tagged caches. In one embodiment, the L1 caches 16, 26 may be physically indexed. Alternatively, in another embodiment, these caches may be virtually indexed. In a still further embodiment, these two caches 16, 26 may be cache writeback units configured to write information to a Level-2 (L2) cache or a higher level cache (e.g., a Level-3 or L3 cache) collectively referenced by block "28." In a multi-core configuration, a single L2 cache may be shared by two more CPU cores, and a single L3 cache may be coupled to or shared by multiple L2 caches. The shared highest level cache (which may be an L3 cache in particular embodiments) that is called before accessing the system memory is usually referred to as the Last Level Cache (LLC). The LLC may be shared by multiple cores and may be "sliced" into multiple sections, each of which can be accessed independently for reduced latency and increased parallelism. In one embodiment, the control unit 14 may generate prefetch requests. Prefetching involves reading data into a cache before it is requested by the software, thus minimizing the data access latency. The corresponding prefetch data may be stored in the instruction cache 16 and/or the data cache 26. The fetch control unit 14 may be configured to maintain multiple separate and independent prefetch streams.

In one embodiment, different levels of cache memories may be arranged serially—i.e., L1 cache being accessed before an L2 cache, an L2 cache being accessed before an L3 cache, and so on. Furthermore, the L1 cache 26 may be a part of the CPU core 12, whereas the L2 and other higher level (e.g., L3) of caches may be external to the CPU core 12. However, all of these caches may be part of the same processor chip 10. The actual placement of the various cache memories—e.g., whether on the same chip or not, whether as part of a CPU core not, etc.—is a design choice that may be dictated by a given processor's architecture. Thus, it is conceivable to have the L1 caches 16 and 26 external to the chip embodying the CPU core 12.

Memory interface(s) 46 may be configured to manage the transfer of data between the LLC (not shown) and a system memory (not shown), for example, in response to cache fill requests and data evictions. In some embodiments, multiple instances of the memory interface 46 may be implemented, with each instance configured to control a respective bank of the system memory. The memory interface 46 may be configured to interface to any suitable type of system memory, such as, for example, Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM, etc. The memory interface 46 may be configured to simultaneously support interfacing to multiple different types of system memory.

Requests from the core 12 for non-cacheable data, such as data from Input/output (I/O) devices (not shown) as described below with respect to network interface(s) 47 and peripheral interface(s) 48, may be processed by a System Interconnect 50. Thus, the processor 10 may be configured to receive data from sources other than system memory. The system interconnect 50 may provide a central interface for such sources to exchange data with the core 12, and with the L2 and higher level caches at block 28. In particular embodiments, the system interconnect 50 may be configured to coordinate Direct Memory Access (DMA) transfers of data to and from the system memory. For example, via the memory interface 46, the system interconnect 50 may coordinate DMA transfers between the system memory and a network device (not shown) attached via the network interface 47, or between the system memory and a peripheral device (not shown) attached via the peripheral interface 48.

The I/O and peripheral interface 48 may be configured to coordinate data transfer between the processor 10 and one or more peripheral (I/O) devices (not shown). Such peripheral devices may include, for example, storage devices (e.g., magnetic or optical media-based storage devices including hard drives, tape drive, CD drives, DVD drives, etc.), display devices (e.g., graphics workstations), multimedia devices (e.g., audio processing or audio-visual data processing subsystems), data input units, or any other suitable type of peripheral device. In one embodiment, the peripheral interface 48 may implement one or more instances of a standard peripheral interface. For example, one embodiment of the peripheral interface 48 may implement the Peripheral Component Interface Express (PCI Express™) standard. In other embodiments, the peripheral interface 48 may be configured to implement a version of the Universal Serial Bus (USB) protocol or the IEEE 1394 (Firewire®) protocol in addition to or instead of the PCI Express™ protocol.

The network interface 47 may be configured to coordinate data transfer between the processor 10 and one or more network devices (not shown) coupled to the processor 10 via a network (not shown). Such network devices may include, for example, networked computer systems or peripherals. The network may be an Ethernet-based network, an optical fiber network, a cellular telephone network, or a Transmission Control Protocol/Internet Protocol (TCP/IP) based communication network such as the Internet, etc. The network interface 47 may be configured to implement any suitable networking standard such as, for example, an Ethernet (IEEE 802.3) networking standard such as the Gigabit Ethernet or 10-Gigabit Ethernet, 40-Gigabit Ethernet, Fibre Channel or Fibre Channel over Ethernet (FCoE), Data Center Ethernet, etc. In some embodiments, the network interface 47 may be configured to implement multiple discrete network interface ports (not shown).

In one embodiment, the processor 10 may be configured for use in a multi-processor environment with other instances of the processor 10 or other compatible processors (not shown). A coherent processor interface(s) 52 may be provided as part of the processor complex 10. The coherent processor interface 52 may be configured to implement high-bandwidth, direct chip-to-chip communication between different processors in a manner that preserves memory coherence among the various processors (e.g., according to a coherent protocol that governs memory transactions).

FIG. 2 depicts an exemplary flowchart 55 showing what content is stored in an FB (e.g., the FB 40 in FIG. 1) according to one embodiment of the present disclosure when a load miss occurs in an L1 data cache (e.g., the L1 cache 26) associated with the FB. In one embodiment, the operational flow illustrated in the flowchart 55 may be completed in a CPU core (e.g., the CPU core 12 in FIG. 1) over three processor/machine clock cycles as noted in FIG. 2. In the first clock cycle, a Load Store Unit (e.g., the LSU 24) or a similarly-functional entity in the CPU core 12 may pick a Load (Ld) instruction along with its associated Virtual Address (VA) from an LS scheduler (e.g., the LS scheduler 20 in FIG. 1) in the processor core 12, as shown by block 57 in FIG. 2. In the same machine cycle, at block 59, the LSU 24 or the MMU 37 may compare the VA provided by the Ld instruction against entries in a TLB (e.g., the TLB 38 in the MMU 37 in FIG. 1) to generate a TLB entry number (referred to herein as "TLB entry#" or "TLB id#") based on the match. The TLB entry# or TLB id# may indicate the location of a PTE in the TLB that the comparison operation matched on—i.e., the location of a PTE associated with the VA of the Ld instruction picked at block 57. As noted earlier, the PTE in the TLB may provide a mapping between the VA of the Ld instruction and the corresponding Physical Address (PA) of a memory location (e.g., in a system memory (not shown)). According to one embodiment, the TLB id# (generated at block 59) and the VA of the Ld instruction (received at block 57) may be provided for storage into the FB 40 upon a "miss" in the L1, as indicated at block 66 and shown by dotted arrows 60-61.

In the second clock cycle, at block 62, the LSU 24 may first obtain translation of the VA of the Ld instruction into its corresponding PA using the TLB 38 in the MMU 37. In the same clock cycle, the PA of the Ld instruction may be then sent to the hit/miss detection logic 42, which may use the received PA to determine, at decision block 63, whether there is a "hit" in the L1 cache 26 or not. If there is a hit, the data is retrieved from the L1 cache 26 and provided to the execution unit 22 (or other relevant entity). Upon such a hit, the Ld operation can be considered "done", as indicated by arrow 64 in FIG. 2. In that case, the process in FIG. 2 would conclude and, in one embodiment, there may be no need of a third clock cycle to perform the allocation described below.

However, if there is a "miss" in the L1 cache, a third machine cycle may be needed for the LSU 24 to send the miss request to an L2 or other higher level cache (at arrow 67 in FIG. 2) to receive and capture appropriate data into the FB 40. In one embodiment, prior to or concurrently with sending the miss request (for data) to the L2 cache, the miss request may be allocated (block 66) into the FB 40 and the RQ 22 by the LSU 24 in the third machine cycle. In particular embodiments, as part of such allocation, the FB 40 may be configured in hardware (e.g., as shown in FIG. 4) to store one or more of the following therein: the VA of the Ld instruction (received at block 57), the corresponding PA of the Ld instruction (obtained at block 62), the TLB id# (or indication of a location of a PTE in the TLB) generated at block 59, and page size information obtained from the TLB indicating a page size of a memory page (e.g., in the system memory) associated with the PTE/TLB id# generated at block 59. In one embodiment, these parameters may be supplied to the FB 40 under the control of the LSU 24 such as, for example, through the LSU's coupling and interactions with the cache control unit 27. In another embodiment, the TLB 38 itself may be configured to provide certain of these parameters (e.g., the TLB entry#, the PA, the page size information) to the FB 40 without necessarily involving the LSU 24. In one embodiment, the TLB 38 also may store page size information for each page (in a page table in the MMU 37) associated with a corresponding PTE stored in the TLB 38. Alternatively, the LSU 24 or the TLB 38 may be configured to simply provide this information to the FB 40 without necessarily storing it in the TLB 38. Upon an L1 miss at block 63 and subsequent to (or simultaneously with) the allocation at block 66, a miss request may be sent to an L2 cache as indicated by arrow 67 in FIG. 2. In one embodiment, the data being captured into the FB may be simultaneously read from the FB (i.e., provided to the system bus 30 to be sent to, for example, the execution unit 22) to continue processing of the Ld instruction. In particular embodiments, such reading may be initiated by the LSU 24 alone or in conjunction with the hit/miss detection logic 42.

It is noted here that the page size information may be required in particular embodiments to figure out the appropriate virtual address bits to compare in the FB 40. (Such comparison is discussed later with reference to block 77 in FIG. 3.) In one embodiment, the page size information may be used to appropriately mask out an FB-stored virtual address as well as the incoming VA bits (at line 104 shown in FIG. 4). The page size information may be desired for the case where there are multiple pages with different page sizes, for example, in a page table in the TLB itself or in the MMU's page table. The page size (e.g., 1 GB memory page, 2 GB memory page, etc.) may provide information as to the size of the VA space mapped to a PA (e.g., by an operating system) in a page table. Thus, for example, two VAs may point to the same PA in the TLB, but each such VA may have a different page size associated with it. Hence, an instruction associated with only one of these two VAs will get to forward from the FB 40 according to particular embodiments of the present disclosure when page sizes are used to mask out appropriate bits in the FB-stored VA as well as in the VA of the Ld instruction prior to comparison of these two VAs.

It is noted here that although various steps illustrated in FIG. 2 are discussed above as being "performed" by one or more of the following units in the CPU core 12—the LSU 24, the TLB 38, the hit/miss detection logic 42, and the FB 40, entities other than or in addition to these units in the core 12 also may be involved. All of the "participating" units may be suitably configured in hardware (and, if necessary, in software such as, for example, using microcode) to enable them to "perform" the corresponding steps. On the other hand, a single entity may perform many or all of the aspects shown in FIG. 2. For example, in one embodiment, the blocks 57, 59, 62, and 66 may represent actions of a TLB that receives an Ld instruction and its VA from an LS scheduler (e.g., via an LSU). Thus, it may not be preferable or fruitful in particular embodiments to exactly identify each core-based entity or unit associated with a particular process step. Rather, it is more suitable to recognize that the CPU core 12, in general, may be configured, preferably in hardware, to "perform" the process steps illustrated in FIGS. 2 and 3.

FIG. 3 is an exemplary flowchart 70 showing how FB forwarding at high frequencies may be supported according to one embodiment of the present disclosure. As discussed in more detail below, according to particular embodiments of the present disclosure, FB forwarding may be started prior to the conclusion of the comparison of a PA against FB entries. By starting the forwarding process in cycle 2 (discussed later below) using the VA, the FB forwarding operation can be split across two cycles—here, cycles "2" and "3" in the embodiment of FIG. 3. This allows individual cycles to be shorter and, hence, higher frequency operations are possible. Such higher frequency operations may not be possible when a PA-based comparison is exclusively used because the PA is available later than the VA during instruction execution. Furthermore, the PA comparison and the FB forwarding determination—both in one clock cycle—are also avoided using the cycle-splitting mentioned here. FIG. 3 depicts an exemplary set of operational steps that may be performed according to one embodiment of the present disclosure after an initial Ld miss has already occurred and the allocation at block 66 in FIG. 2 has already taken place. Thus, the embodiment in FIG. 2 relates to an initial Ld operation, whereas the embodiment in FIG. 3 relates to a subsequent Ld operation where faster FB forwarding according to teachings of the present disclosure may be accomplished. However, in some embodiments, the steps depicted in FIG. 3 may be performed as part of the initial Ld operation as well.

Briefly, FIG. 3 may relate to a (subsequent) load operation that sends its non-translated virtual address for an early comparison against the entries in the FB, and is then qualified with the TLB entry# to perform a comparison to determine a "hit" in the FB. This hit determination is fast and enables forwarding the data from the FB to the load (Ld) in a timely manner without necessarily waiting for the comparison of a lengthy PA to conclude. As shown, the operations in FIG. 3 may be concluded over three clock cycles. However, as depicted, more tasks may be accomplished over those three clock cycles once the initial allocation/storage at block 66 is in place. In the first clock/machine cycle, at block 72 in FIG. 3, in one embodiment, the LSU 24 may pick a Ld instruction and its VA from the LS scheduler 20 (e.g., in case of an initial Ld operation) or the RQ 32 (e.g., when the initial Ld operation did not "hit" in the L1 and had a prior miss request allocated into the RQ). The LSU 24 may then compare the VA against the entries in the TLB 38 to generate a TLB id# (i.e., an indication of a PTE in the TLB associated with the received VA) based on the match (block 74).

In the second clock cycle in FIG. 3, a number of operations may take place. The particular order of these operations—whether all or some being performed in parallel, or whether they are performed in a particular sequence—is less important and, hence, is not emphasized in the discussion herein. It is understood, however, that the FB forwarding prediction in the second clock cycle allows FB forwarding to commence sooner, without the need to wait for the completion of a PA against all FB entries (in the third clock cycle, as discussed below). This "pre-forwarding" approach supports FB forwarding at high frequencies by allowing the pre-forwarding process to commence sooner and, hence, allowing the cycle time to be shrunk. The block 75 in FIG. 3 is identical to the block 62 in FIG. 2 and, hence, is not discussed in any additional detail herein. In one embodiment, in addition to the VA-to-PA translation at block 75, one or more of the operations shown at blocks 77-79 may occur prior to, concurrent with, or subsequent to the VA-to-PA translation. For example, at block 77, the FB 40 may start the comparison of the VA bits (received from the Ld instruction at block 72) against the virtual addresses stored in the FB 40. Also, if the page size information is not already stored in the FB (as discussed earlier with reference to block 66 in FIG. 2), in one embodiment, the FB 40 may read out, at block 78, the page size from the TLB 38 associated with the TLB id# generated at block 74. The operation at block 78 may be optional—as indicated by the dotted line 80—depending on whether the page size for the TLB id# (at block 74) is already stored in the FB or not. In one embodiment, the page size at block 78 may be used by the FB 40 at block 77 to mask out appropriate bits in an FB-stored VA, thereby generating a Partial Virtual Address (PVA) for comparison with relevant bits of the VA of the Ld instruction (i.e., the bits in the incoming VA (at line 104 in FIG. 4) resulting after the incoming VA is also similarly masked by that page size). As shown in FIG. 4 (discussed later below), in one embodiment, the FB 40 may store page sizes associated with the VAs stored in the FB, and each such page size may be used by the FB to mask out appropriate VA bits in the corresponding FB-stored VA, and the resulting PVAs may be then compared against relevant bits of the VA of the Ld instruction as part of the comparison operation at block 77. In one embodiment, the page size read out at block 78 may be applied to the VA of the incoming Ld instruction prior to comparing such "masked" VA of the Ld instruction with the PVAs in the FB. In another embodiment, each FB-stored page size may be applied to the VA of the incoming Ld instruction when comparing such "masked" VA of the Ld instruction with corresponding PVA of an FB-stored VA.

Thus, at block 79 in the second machine cycle in FIG. 3, the FB 40 may obtain a "predicted FB entry" based on a comparison of the PVA of the Ld instruction and the TLB id# (associated with the VA of the Ld instruction) against corresponding entries in the FB. This predicted FB entry may provide initial data that may be read out of the FB 40 as part of the "pre-forwarding" approach mentioned above. However, prior to commencing FB forwarding with this predicted FB entry, the hit/miss detection unit 42 may use the PA of the Ld instruction to determine, at decision block 82, whether there is a "hit" in the L1 cache 26 or not. If there is a hit, the data is retrieved from the L1 cache 26 and provided to the execution unit 22 (or other relevant entity). Upon such a hit, the Ld operation can be considered "done", as indicated by arrow 83 in FIG. 3. In that case, the FB forwarding operation or the sending of the request for data to the L2 cache in the third clock cycle (discussed below) may be avoided.

In one embodiment, irrespective of a "hit" or "miss" at block 82, a third clock cycle may be initiated. In the third clock cycle, the FB forwarding may start at block 85 using the predicted FB entry as the data to be forwarded to, for example, the execution unit 22 (or other relevant entity) for processing the Ld instruction. However, concurrently with or subsequent to the start of the read of the data at block 85, the FB 40 may compare the PA from the TLB (as obtained at block 75) against physical addresses stored in the FB 40 to obtain a matching data entry, referred to herein as an "actual FB entry." Thus, the PA comparison may take place at block 87 after the start of the read of the data from the FB at block 85. In other words, the FB forwarding may not have to be delayed until the conclusion of the comparison of a large physical address (which may be as big as 40 bits). The actual FB entry obtained at block 87 is the true FB entry that needs to be forwarded to an Ld execution.

It is observed here that this actual FB entry may be different from the predicted FB entry obtained at block 79. For example, the predicted FB entry is obtained by comparing the incoming VA (at block 72) against each VA stored in the FB 40. Thus, the predicted FB entry is based on a VA-to-VA comparison only, and does not involve any PA comparison. Such VA-to-VA comparison based decision-making may result in an inaccuracy, for example, in the case where the translation in the TLB 38 has been replaced (e.g., as a result of TLB invalidations or page table look-up failures) and the new translation points the same VA to a different PA. In that case, the VA-to-VA comparison may not suffice because the PA in the FB (associated with the VA of the Ld instruction) may not be the same as the new (actual) PA in the TLB 38 for the same VA. Hence, in one embodiment of the present disclosure, a mechanism to detect and handle incorrect forwarding from the FB 40 is provided as well. To avoid the problem arising from solely VA-to-VA comparison, the present disclosure contemplates a comparison of the PA of the Ld instruction (as obtained at block 75) against each PA in the FB 40. When a PA in the FB matches with the PA of the Ld instruction, the corresponding data entry in the FB 40 is considered the "actual FB entry." In one embodiment, the FB 40 may be configured to compare the entry number of the predicted FB entry against the entry number of this actual FB entry to validate the earlier-started FB forwarding (using the predicted FB entry), as indicated by decision block 90 in FIG. 3. If the actual and the predicted FB entries match, the Ld is done, as indicated by arrow 91. However, if the actual and the predicted FB entries do not match at block 90, the Ld instruction and the earlier-started FB forwarding are cancelled, as indicated by arrow 92 in FIG. 3. Such "cancellation" may ignore the data obtained as a result of the Ld execution. The Ld instruction may be reissued thereafter so that it can be replayed or re-executed at a later point in time and can complete its execution successfully with the correct data. Thus, when a false hit is detected (i.e., when the FB forwarding at block 85 turns out to be false), the safety mechanism (in the FB 40) based on validation of the earlier FB forwarding (at block 90) may generate a late load cancel indication which causes the load to replay when the FB entry deallocates.

In one embodiment, in the event that a Page Table Entry (PTE) in the TLB 38 that is also captured in the FB 40 gets replaced (e.g., as a result of a TLB miss or invalidation event), appropriate information is logged in the FB (by the TLB) to not forward the data to a subsequent load. In one embodiment, the TLB 38 may be configured to communicate or send an appropriate indication to the FB 40 when such an entry has been replaced. The replaced entry number is compared against the TLB entry numbers stored in the FB. The matching entry in the FB is marked as not being able to forward. This operation may be a rare occurrence and should have negligible impact on the performance of the FB forwarding aspects illustrated in FIGS. 2-4.

As in the case of FIG. 2, it is noted here that although various steps illustrated in FIG. 3 are discussed above as being "performed" by one or more of the following units in the CPU core 12—the LSU 24, the TLB 38, the hit/miss detection logic 42, and the FB 40, entities other than or in addition to these units in the core 12 also may be involved. All of the "participating" units may be suitably configured in hardware (and, if necessary, in software such as, for example, using microcode) to enable them to "perform" the corresponding steps. On the other hand, a single entity may perform many or all of the aspects shown in FIG. 3. For example, in one embodiment, the blocks 72, 74, and 75 may represent actions of a TLB. Thus, it may not be always desirable to exactly identify each core-based entity or unit associated with a particular process step. Rather, it is more suitable to recognize that the CPU core 12, in general, may be configured, preferably in hardware, to "perform" the process steps illustrated in FIG. 3.

FIG. 4 shows exemplary hardware configurations of a TLB (e.g., the TLB 38 in FIG. 1) and an FB (e.g., the FB 40 in FIG. 1) to implement the FB forwarding according to one embodiment of the present disclosure. For the sake of simplicity, only the relevant portions of the TLB 38 and the FB 40 are shown without detailed architectural layouts of the TLB 38 and the FB 40. The hardware configurations shown in FIG. 4 may be used to implement the methodologies illustrated in FIGS. 2 and 3. Because the operations shown in FIGS. 2 and 3 are discussed in detail earlier, such discussion is not repeated herein. Rather, only the relevant hardware configuration is described here in the context of FIG. 4.

As shown in FIG. 4, the TLB 38 may store "N" virtual addresses—indicated by blocks 95 through 98, and corresponding "N" physical addresses—indicated by blocks 100 through 103. Thus, the TLB 38 may be a cache of recently used VA-to-PA mappings from the operating system's page table. The VA of a Ld instruction may be received by the TLB 38 as indicated by line 104. As noted earlier, the VA of the Ld instruction may be received by the TLB 38 as part of processing at block 57 in FIG. 2 or at block 72 in FIG. 3. The received VA at line 104 may be compared against each VA—i.e., VA 1 through VA N—stored in the TLB 38 to generate a TLB entry# upon a match. This VA-to-VA comparison may be performed using corresponding comparators 105 through 108. The generated TLB entry# (i.e., the indication of a location of a PTE corresponding to the Ld instruction's VA) is symbolically represented by arrows having reference numeral "110" in FIG. 4. The generation of such TLB entry# is shown at block 59 in FIG. 2 and at block 74 in FIG. 3. The generated TLB entry# may be used to select a corresponding physical address using a selector 112 (which may be a multiplexer in hardware configuration). The output of the selector 112 is the "translated" PA, which is indicated by line 113 in FIG. 4. In this manner, the VA to PA translation shown at block 62 in FIG. 2 and at block 75 in FIG. 3 may be accomplished.

In one embodiment, the TLB entry# at line 110 may be encoded at block 114 and applied to each comparator 116-119 in the FB 40 (as indicated by arrows 115) for performing FB VA compare as described herein. Such encoding may reduce the size of the hardware comparator. For example, by comparing the encoded version, one can compress/reduce the number of bits to be compared and, hence, hardware costs can be reduced as well.

In one embodiment, the FB 40 may store the following as discussed earlier with reference to block 66 in FIG. 2: (i) "P" virtual addresses—VA1 through VA P (where P≤N), indicated by blocks 121 through 124, respectively; (ii) corresponding "P" physical addresses—PA 1 through PA P, indicated by blocks 126 through 128, respectively; (iii) TLB entry numbers for each VA stored in the FB 40, as indicated by TLB ENT#1 through TLB ENT#P at blocks 130 through 133, respectively; and (iv) page size received from the TLB 38 corresponding to each TLB entry# stored in the FB, as indicated by PgSz 1 through PgSz P at blocks 135 through 138, respectively. In one embodiment, the FB 40 may be comprised of "P" buffers, each buffer storing a corresponding set of parameters—i.e., a VA, its associated PA, its associated TLB ENT#, and its associated PgSz. In another embodiment, the FB 40 may be implemented as a single buffer storing all of the parameters shown in FIG. 4 as multiple entries thereof.

In the embodiment of FIG. 4, the comparators 116-119 may receive respective inputs as shown. In other words, each comparator may receive the following as its inputs: (i) the Ld instruction's VA (from line 104), (ii) the TLB entry# (from line 115), (iii) an FB-stored VA, (iv) an FB-stored TLB entry# corresponding to the FB-stored VA, and (v) an FB-stored page size corresponding to the FB-stored TLB entry#. The operations discussed earlier with reference to blocks 77 and 79 in FIG. 3 may be carried out using the comparators 116-119 to generate a "predicted FB entry" 142. Each comparator 116-119 may perform a comparison between the TLB entry# (at line 115) and the corresponding FB-stored TLB entry#, as well as another comparison between an FB-stored VA (appropriately masked using the FB-stored page size, as discussed earlier) and relevant bits of the Ld instruction's VA (from line 104). As discussed earlier, the Ld instruction's VA may be masked as well using a corresponding page size. A comparator finding a match during both of the above-mentioned two comparisons may allow the corresponding FB data entry to be output as the "predicted FB entry" 142. This may also allow the FB 40 to start data forwarding (as indicated at arrow 143) without waiting for the PA comparison to conclude, as discussed earlier with reference to block 85 in FIG. 3.

The "actual FB entry" (discussed with reference to block 87 in FIG. 3) may be generated in the FB 40 based on a comparison of the Ld instruction's PA received from the TLB 38 (at line 113) against each PA stored in the FB (as indicated by blocks 126-128) using a respective comparator from the group of comparators 145 through 147. The FB data entry associated with the matching PA is the "actual FB entry" shown by arrow 149 in FIG. 4. The FB forwarding validation discussed earlier with reference to block 90 in FIG. 3 may be accomplished in hardware using a comparator 150 to compare the predicted FB entry number 142 with the actual FB entry number 149. A mismatch would result in the cancellation of data forwarding (started at line 143) as indicated by arrow 152 in FIG. 4. As mentioned earlier, a load cancel indication may be generated at arrow 152 which causes the Ld to replay when the earlier-sent FB data entry (i.e., the "predicted FB entry") deallocates. As part of such late load cancel indication, the earlier-started FB forwarding is canceled by ignoring the data obtained as a result of the Ld execution. The Ld is then replayed or re-executed at a later point in time and tries to complete successfully with the correct data.

It is noted here that although the foregoing discussion of FIGS. 2-4 is primarily provided in the context of execution of a load (Ld) instruction, it is understood that inventive aspects shown and discussed with reference to FIGS. 2-4 equally apply to store (St) operations as well, with suitable modifications to account for processing differences between a load instruction and a store instruction. However, for the sake of brevity, processing of a store instruction according to the teachings of the present disclosure is not discussed herein.

Figure 5:
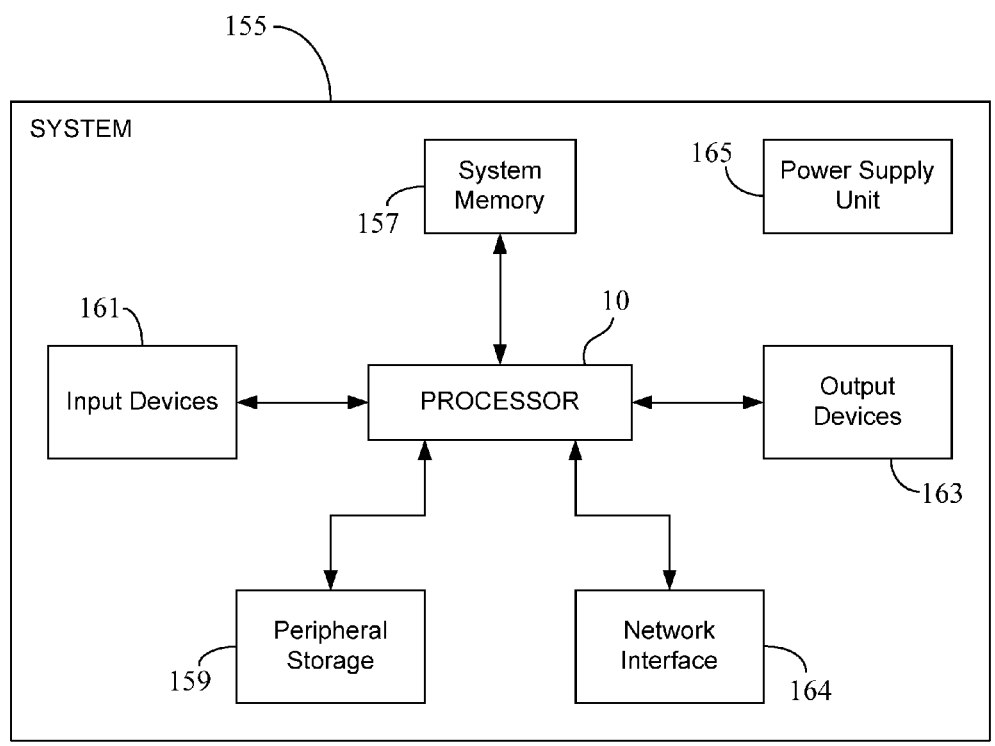
FIG. 5 depicts an exemplary system or apparatus that includes the processor of FIG. 1 according to one embodiment of the present disclosure.

FIG. 5 depicts an exemplary system or apparatus 155 that includes the processor 10 of FIG. 1 according to one embodiment of the present disclosure. As discussed earlier, the processor 10 may include the hardware shown in the exemplary embodiments of FIGS. 1 and 4 to perform the operations illustrated in the exemplary embodiments of FIGS. 2 and 3. Thus, the processor 10 may be "configured" in hardware (and, to some extent, in software, if necessary) to accomplish FB forwarding at high frequencies as per the inventive aspects of the present disclosure. As discussed with reference to FIG. 1, the processor 10 also may be configured to interface with a number of external devices. In FIG. 5, the processor 10 is shown coupled to a system memory 157, a peripheral storage unit 159, one or more input devices 161, one or more output devices 163, and a network interface unit 164. In some embodiments, the system 155 may include more than one instance of the devices shown. Some examples of the system 155 include a computer system (desktop or laptop), a tablet computer, a mobile device, a cellular phone, a video gaming unit or console, a machine-to-machine (M2M) communication unit, a stateless "thin" client system, or any other type of computing or data processing device. In various embodiments, the system 155 may be configured as a rack-mountable server system, a standalone system, or in any other suitable form factor. In some embodiment, the system 155 may be configured as a client system rather than a server system.

In particular embodiments, the processor 10 may include more than one core (as mentioned earlier with reference to FIG. 1), and/or the system 155 may include more than one processor (e.g., in a distributed processing configuration). When the system 155 is a multiprocessor system, there may be more than one instance of the processor 10 or there may be multiple processors coupled to the processor 10 via their respective coherent processor interfaces 52 (FIG. 1).

In various embodiments, the system memory 157 may comprise any suitable type of memory as described earlier, such as FB-DIMM, DDR/DDR2/DDR3/DDR4 SDRAM, Rambus® DRAM, flash memory, and of various types of Read Only Memory (ROM), etc. In one embodiment, the system memory 157 may include multiple discrete banks of memory controlled by discrete memory interfaces in the embodiments of the processor 10 that provide multiple memory interfaces 46 (FIG. 1). Also, in some embodiments, the system memory 157 may include multiple different types of memory, as opposed to a single type of memory.

The peripheral storage unit 159, in various embodiments, may include support for magnetic, optical, magneto-optical, or solid-state storage media such as hard drives, optical disks (such as CDs or DVDs), non-volatile RAM devices, etc. In some embodiments, the peripheral storage unit 159 may include more complex storage devices/systems such as disk arrays (which may be in a suitable RAID (Redundant Array of Independent Disks) configuration) or Storage Area Networks (SANs), which may be coupled to the processor 10 via a standard Small Computer System Interface (SCSI), a Fibre Channel interface, a Firewire® (IEEE 1394) interface, or another suitable interface. In one embodiment, the peripheral storage unit 159 may be coupled to the processor 10 via the peripheral interface(s) 48 (FIG. 1).

In particular embodiments, the input devices 161 may include standard input devices such as a computer keyboard, mouse or other pointing device, a touchpad, a joystick, or any other type of data input device. The output devices 163 may include a graphics/display device, a computer screen, an audio speaker, an alarm system, a CAD/CAM (Computer Aided Design/Computer Aided Machining) system, a video game station, or any other type of data output or process control device. In some embodiments, the input device(s) 161 and the output device(s) 163 may be coupled to the processor 10 via the I/O and peripheral interface(s) 48 (FIG. 1).

In one embodiment, the network interface 164 may communicate with the processor's internal network interface 47 to enable the system 155 to couple to a network (not shown). In another embodiment, the network interface 164 may represent an instance of the processor's network interface 47 or may be absent altogether. The network interface 164 may include any suitable devices, media and/or protocol content for connecting the system 155 to a network—whether wired or wireless. In various embodiments, the network may include Local Area Networks (LANs), Wide Area Networks (WANs), wired or wireless Ethernet, telecommunication networks, or other suitable types of networks.

The system 155 may include an on-board power supply unit 165 to provide electrical power to various system components illustrated in FIG. 5. The power supply unit 165 may receive batteries or may be connectable to an AC electrical power outlet. In one embodiment, the power supply unit 165 may convert solar energy into electrical power.

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein (e.g., in FIG. 1) can represent conceptual views of illustrative circuitry or other functional units embodying the principles of the technology. Similarly, it will be appreciated that the flow charts in FIGS. 2-3 represent various processes which may be substantially performed by a processor (e.g., the processor 10 in FIGS. 1 and 5). The processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 2-3 may be provided by the processor, preferably in the hardware using, for example, its CPU core.

When certain inventive aspects require software-based processing, such software or program code may reside in a computer-readable data storage medium (not shown). Such data storage medium may be part of the peripheral storage 159 in the embodiment of FIG. 5, or may be part of the processor's 10 internal memory. The processor 10 (FIG. 5) may execute instructions stored on such a medium to carry out the software-based processing. The computer-readable data storage medium may be a non-transitory data storage medium containing a computer program, software, firmware, or microcode for execution by a general purpose computer or a processor mentioned above. Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

Alternative embodiments of the efficient FB forwarding technique according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, the functions of some of the elements in the processor 10 may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes an FB forwarding scheme that allows data forwarding from an FB at higher frequencies. When a load (Ld) operation misses in an L1 cache and sends a request for data to the L2 or higher level cache (or system bus), the following parameters are stored in an FB: (i) a virtual address of the Ld instruction that caused the cache "miss", (ii) a tag indicating the location of a physical address in a TLB (i.e., a TLB entry# or location of a Page Table Entry (PTE) in the TLB) associated with the VA of the Ld instruction, and (iii) the page size information obtained from the TLB indicating the page size of the memory page associated with the PTE. Subsequent load operations send their non-translated virtual address for an early comparison against the VA entries in the FB, and are then further qualified with the TLB entry# to determine a "hit." This hit determination is fast and enables forwarding the data from the FB to the Ld instruction in a timely manner. A safety net mechanism may be employed to detect a false hit in the FB and to generate a late load cancel indication to cancel the earlier-started FB forwarding by ignoring the data obtained as a result of the Ld execution. The Ld is then replayed or re-executed at a later point in time and tries to complete successfully with the correct data.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method comprising:
    determining whether there is a hit in a first level of cache memory for a processor when a Load (Ld) instruction is processed for a first execution; and
    in the absence of the hit in the first level of cache memory, storing the following in a Fill Buffer (FB) of the processor:
        a first Virtual Address (VA) provided by the Ld instruction, and
        a first indication of a location of a first Page Table Entry (PTE) in a Translation Look-aside Buffer (TLB) of the processor, wherein the first PTE is associated with the first VA provided by the Ld instruction.

2. The method of claim 1, wherein the method further comprises: in the absence of the hit in the first level of cache memory, capturing data associated with the Ld instruction into the FB from a second level of cache memory for the processor.

3. The method of claim 2, wherein capturing the data associated with the Ld instruction into the FB includes:
    obtaining from the TLB a Physical Address (PA) associated with the first VA; and
    storing the PA in the FB.

4. The method of claim 1, further comprising performing the following upon a subsequently-occurring second execution of the Ld instruction:
    comparing a second VA provided by the Ld instruction against entries in the TLB to obtain a second indication of a location of a second PTE in the TLB, wherein the second PTE is associated with the second VA provided by the Ld instruction;
    comparing the second VA and the second indication against entries in the FB to determine whether the second VA matches the first VA stored in the FB and whether the second indication matches the first indication stored in the FB; and
    upon finding a match between the first and the second VAs and between the first and the second indications, identifying a corresponding matching entry in the FB as a predicted FB entry and starting to read data associated with the Ld instruction from the FB using the predicted FB entry.

5. The method of claim 4, further comprising:
prior to comparing the second VA with the first VA, obtaining from the TLB a page size of a memory page associated with the second PTE,
and wherein comparing the second VA includes:
masking a pre-determined number of bits in the first VA using the page size to obtain a first Partial Virtual Address (PVA);
masking the pre-determined number of bits in the second VA using the page size to obtain a second PVA; and
comparing the first and the second PVAs to determine whether the second VA matches the first VA.

6. The method of claim 4, further comprising:
translating the second VA using the TLB to obtain a second VA-specific Physical Address (PA);
comparing the second VA-specific PA against each PA stored in the FB to determine whether the second VA-specific PA matches any of the PAs stored in the FB;
upon finding a matching PA in the FB for the second VA-specific PA, identifying a corresponding entry in the FB as an actual FB entry for forwarding to the Ld instruction;
determining whether a first entry number of the actual FB entry matches with a second entry number of the predicted FB entry; and
when the first and the second entry numbers fail to match, canceling the earlier-started reading of the data from the FB associated with the predicted FB entry.

7. The method of claim 1, further comprising:
upon replacement of the first PTE in the TLB with a different PTE, configuring the FB to avoid forwarding the FB-stored data associated with the first indication as part of a subsequently-occurring second execution of the Ld instruction.

8. The method of claim 1, further comprising storing the following in the FB in the absence of the hit in the first level of cache memory: information obtained from the TLB indicating a page size of a memory page associated with the first PTE.

9. A method of processing a Load (Ld) instruction for execution by a Load Store (LS) scheduler of a processor, wherein the method comprises:
comparing a first Virtual Address (VA) provided by the Ld instruction against entries in a Translation Look-aside Buffer (TLB) of the processor to obtain a first indication of a location of a first Page Table Entry (PTE) in the TLB, wherein the first PTE is associated with the first VA of the Ld instruction;
comparing the first VA and the first indication against entries in a Fill Buffer (FB) of the processor to determine whether the first VA matches a second VA provided by the Ld instruction and stored in the FB, and whether the first indication matches a second indication stored in the FB, wherein the second indication is an indication of a location of a second PTE in the TLB, wherein the second PTE is associated with the second VA of the Ld instruction, and wherein the second VA and the second indication are stored in the FB along with information obtained from the TLB indicating a page size of a memory page associated with the second PTE when an earlier processing of the Ld instruction by the LS scheduler for execution results in the absence of a hit in a cache memory for the processor; and
upon finding a match between the first and the second VAs and between the first and the second indications, identifying a corresponding matching entry in the FB as a predicted FB entry and starting to read the data from the FB associated with the predicted FB entry.

10. The method of claim 9, wherein comparing the first VA includes:
masking a pre-determined number of bits in the second VA using the page size to obtain a Partial Virtual Address (PVA); and
comparing a predetermined group of bits in the first VA against the PVA to determine whether the first VA matches the second VA.

11. The method of claim 9, further comprising:
translating the first VA using the TLB to obtain a first VA-specific Physical Address (PA);
comparing the first VA-specific PA against each PA stored in the FB to determine whether the first VA-specific PA matches any of the PAs stored in the FB;
upon finding a matching PA in the FB for the first VA-specific PA, identifying a corresponding entry in the FB as an actual FB entry for forwarding to the Ld instruction;
determining whether a first entry number of the actual FB entry matches with a second entry number of the predicted FB entry; and
when the first and the second entry numbers fail to match, canceling the earlier-started reading of the data from the FB associated with the predicted FB entry.

12. A processor comprising:
a first level of cache memory;
a detection logic coupled to the first level of cache memory and configured to determine whether there is a hit in a first level of cache memory when a Load (Ld) instruction is processed for a first execution;
a Fill Buffer (FB) coupled to the first level of cache memory;
a Load Store Unit (LSU) coupled to the FB and the detection logic, and configured to capture data associated with the Ld instruction into the FB in the absence of the hit in the first level of cache memory; and
a Translation Look-aside Buffer (TLB) coupled to the FB and the LSU, and configured to store therein a first indication of a location of a first Page Table Entry (PTE) associated with a first Virtual Address (VA) provided by the Ld instruction, and
wherein the FB is configured to store therein the following:
the first VA, and
the first indication of the location of the first PTE.

13. The processor of claim 12, further comprising:
a second level of cache memory coupled to the LSU,
wherein the LSU is configured to capture the data into the FB from the second level of cache memory.

14. The processor of claim 12, wherein, upon a subsequently-occurring second execution of the Ld instruction:
the TLB is configured to compare a second VA provided by the Ld instruction against entries in the TLB to obtain a second indication of a location of a second PTE in the TLB, wherein the second PTE is associated with the second VA provided by the Ld instruction;
the FB is configured to compare the second VA and the second indication against entries in the FB to determine whether the second VA matches the first VA stored in the FB and whether the second indication matches the first indication stored in the FB; and upon finding a match between the first and the second VAs and between the first and the second indications, the FB is configured to identify a corresponding matching entry in the FB as a predicted FB entry and start reading the data from the FB associated with the predicted FB entry.

15. The processor of claim 14, wherein the FB is configured to further perform the following:
   prior to comparing the second VA with the first VA, obtain from the TLB a page size of a memory page associated with the second PTE,
   mask a pre-determined number of bits in the first VA using the page size to obtain a first Partial Virtual Address (PVA);
   mask the pre-determined number of bits in the second VA using the page size to obtain a second PVA; and
   compare the first and the second PVAs to determine whether the second VA matches the first VA.

16. The processor of claim 14, wherein the FB is configured to further perform the following:
   mask a pre-determined number of bits in the first VA using a page size to obtain a Partial Virtual Address (PVA); and
   compare a predetermined group of bits in the second VA against the PVA to determine whether the second VA matches the first VA.

17. The processor of claim 14, wherein the TLB is configured to translate the second VA to obtain a second VA-specific Physical Address (PA), and wherein the FB is configured to perform the following:
   compare the second VA-specific PA against each PA stored in the FB to determine whether the second VA-specific PA matches any of the PAs stored in the FB;
   upon finding a matching PA in the FB for the second VA-specific PA, identify a corresponding entry in the FB as an actual FB entry for forwarding to the Ld instruction;
   determine that a first entry number of the actual FB entry fails to match with a second entry number of the predicted FB entry; and
   generate an indication to cancel the earlier-started reading of the data from the FB associated with the predicted FB entry.

18. The processor of claim 12, wherein, upon replacement of the first PTE in the TLB with a different PTE, the TLB is configured to instruct the FB to avoid forwarding the FB-stored data associated with the first indication as part of a subsequently-occurring second execution of the Ld instruction.

19. A system comprising:
   a memory configured to store a plurality of program instructions; and
   a processor coupled to the memory to retrieve therefrom and execute the plurality of program instructions, wherein the processor is configured to perform the following:
      determine whether there is a hit in a cache memory for the processor when a Load (Ld) instruction is processed for a first execution by a Load Store (LS) scheduler of the processor, and
      in the absence of the hit in the cache memory, store the following in a Fill Buffer (FB) of the processor:
         a first Virtual Address (VA) of the Ld instruction,
         a first indication of a location of a first Page Table Entry (PTE) in a Translation Look-aside Buffer (TLB) of the processor, wherein the first PTE is associated with the first VA of the Ld instruction, and
         information obtained from the TLB indicating a page size of a memory page associated with the first PTE.

20. The system of claim 19, wherein the processor is configured to further perform the following upon a subsequently-occurring second execution of the Ld instruction:
   compare a second VA provided by the Ld instruction against entries in the TLB to obtain a second indication of a location of a second PTE in the TLB, wherein the second PTE is associated with the second VA provided by the Ld instruction;
   compare the second VA and the second indication against entries in the FB to determine that the second VA matches the first VA stored in the FB and that the second indication matches the first indication stored in the FB; and
   upon finding a match between the first and the second VAs and between the first and the second indications, identify a corresponding matching entry in the FB as a predicted FB entry and start to read the data from the FB associated with the predicted FB entry.

21. The system of claim 20, wherein the processor is configured to further perform the following:
   translate the second VA using the TLB to obtain a second VA-specific Physical Address (PA);
   compare the second VA-specific PA against each PA stored in the FB to determine whether the second VA-specific PA matches any of the PAs stored in the FB;
   upon finding a matching PA in the FB for the second VA-specific PA, identify a corresponding entry in the FB as an actual FB entry for forwarding to the Ld instruction;
   determine that a first entry number associated with the actual FB entry fails to match with a second entry number associated with the predicted FB entry; and
   upon determining that the first and the second entry numbers fail to match, cancel the earlier-started reading of the data from the FB associated with the predicted FB entry.

* * * * *